United States Patent [19]
Winterton

[11] 4,434,991
[45] Mar. 6, 1984

[54] TANK CARRIER

[76] Inventor: Dean A. Winterton, R.R. 1, Paw Paw, Ill. 61353

[21] Appl. No.: 410,306

[22] Filed: Aug. 23, 1982

[51] Int. Cl.³ .............................................. B60P 3/22
[52] U.S. Cl. ................................. 280/5 R; 280/460 R; 280/111
[58] Field of Search ............. 280/5 R, 5 C, 5 H, 5 B, 280/7, 476, 460 R, 481, 111, 64; 222/608, 610

[56] References Cited

U.S. PATENT DOCUMENTS

| | | | |
|---|---|---|---|
| D. 163,612 | 6/1951 | Kunz et al. ..................... | D12/101 |
| 509,886 | 12/1893 | Finke ................................ | 280/64 |
| 2,104,734 | 1/1938 | Carpenter ..................... | 280/460 R |
| 2,198,270 | 4/1940 | Maranville ................... | 280/460 R |
| 2,325,822 | 8/1943 | Whitmer ....................... | 280/476 R |
| 2,460,466 | 2/1949 | Nogle ........................... | 280/476 R |
| 3,003,775 | 10/1961 | Ackley ........................... | 280/5 R |
| 3,428,335 | 2/1969 | Clark ............................. | 280/479 |
| 3,588,139 | 6/1971 | Bayne ........................... | 280/43.22 |
| 3,650,501 | 3/1972 | Streb ............................. | 280/5 R |
| 3,718,343 | 2/1973 | Mills ............................. | 280/116 |
| 4,106,795 | 8/1978 | Henning ....................... | 280/481 |
| 4,211,175 | 7/1980 | van der Lely .............. | 280/5 R |
| 4,322,086 | 3/1982 | Bennink ....................... | 280/5 R |

FOREIGN PATENT DOCUMENTS

| | | | |
|---|---|---|---|
| 114320 | 12/1941 | Australia ................ | 280/460 R |
| 1907164 | 7/1978 | Fed. Rep. of Germany ...... | 280/211 |

Primary Examiner—John A. Pekar
Attorney, Agent, or Firm—Mathew R. P. Perrone, Jr.

[57] ABSTRACT

A tank carrier for carrying agricultural liquid for application to fields has a tank frame is pivotally suspended below a castor wheel frame at one end thereof and is hitched to a tractor or other pulling device at the other end thereof.

22 Claims, 9 Drawing Figures

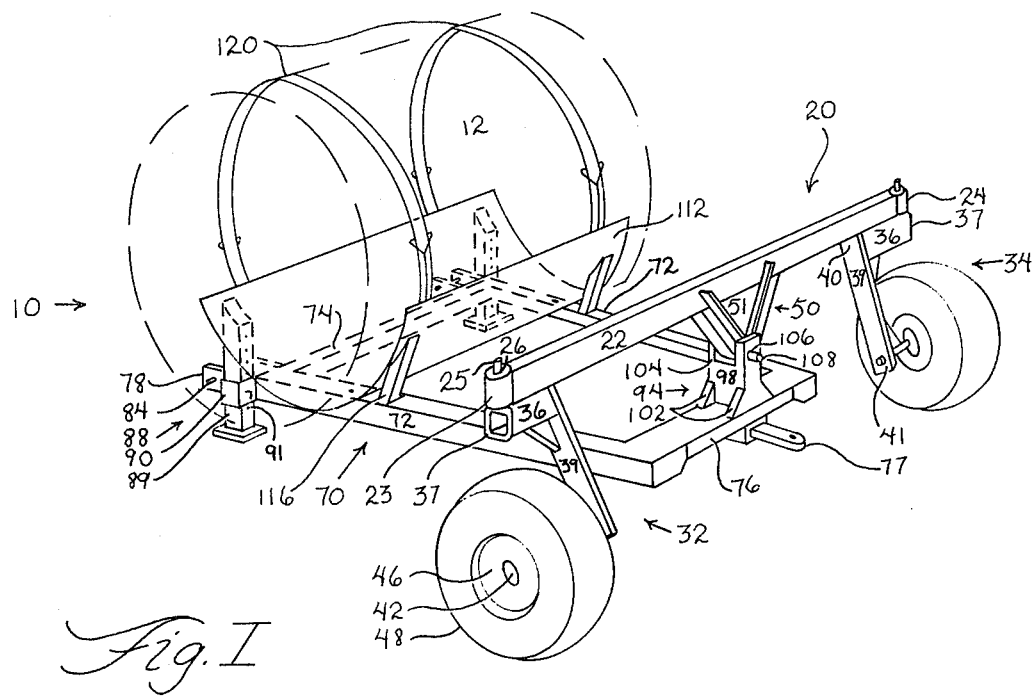
Fig. I
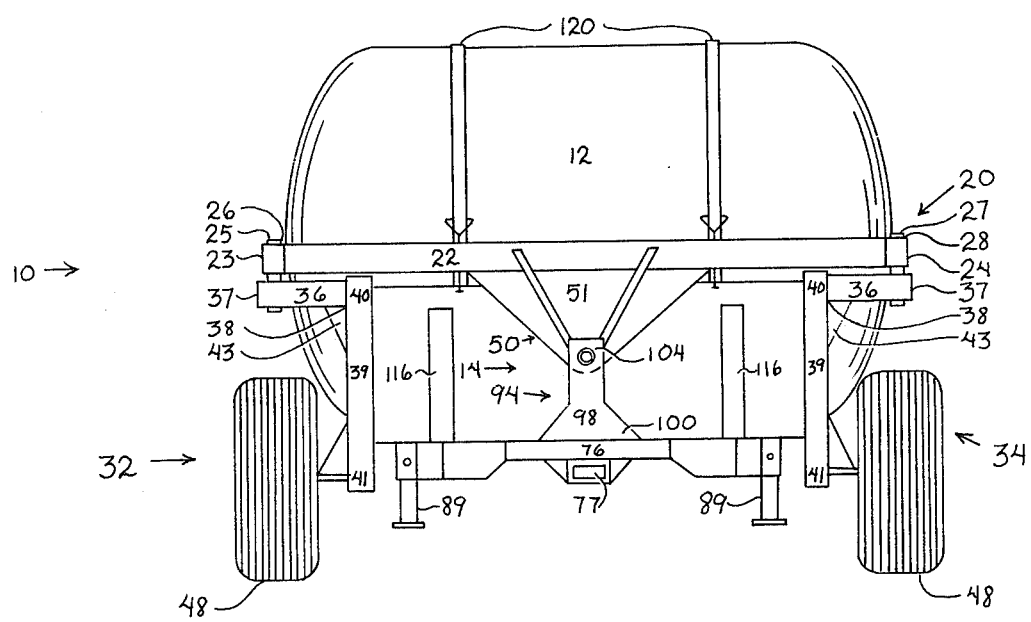
Fig. II

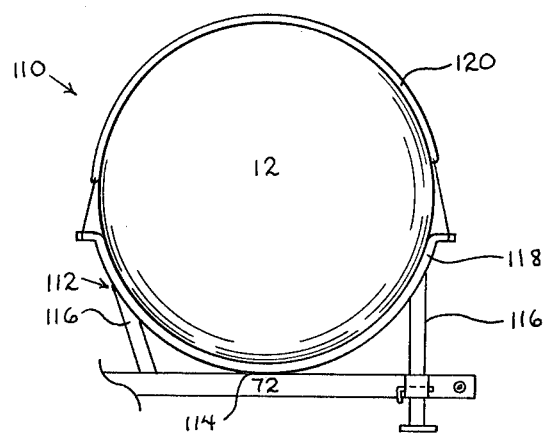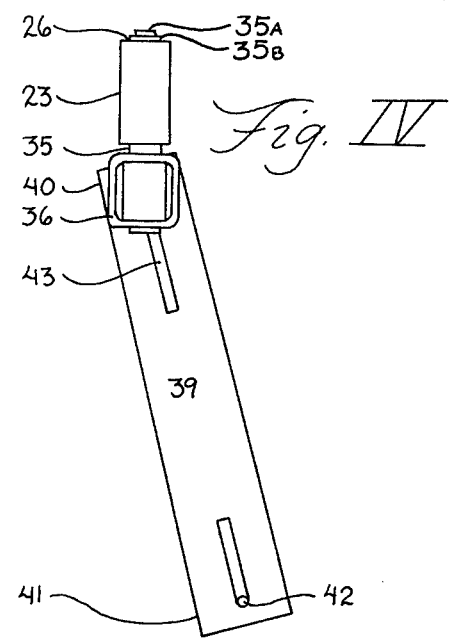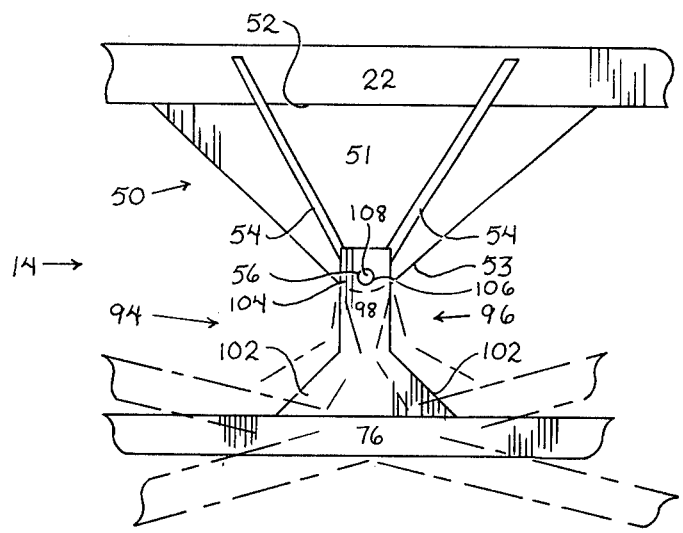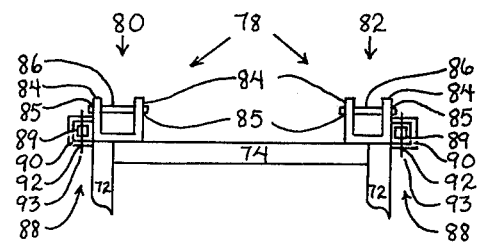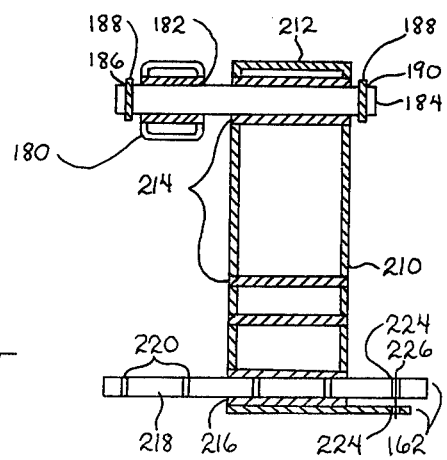

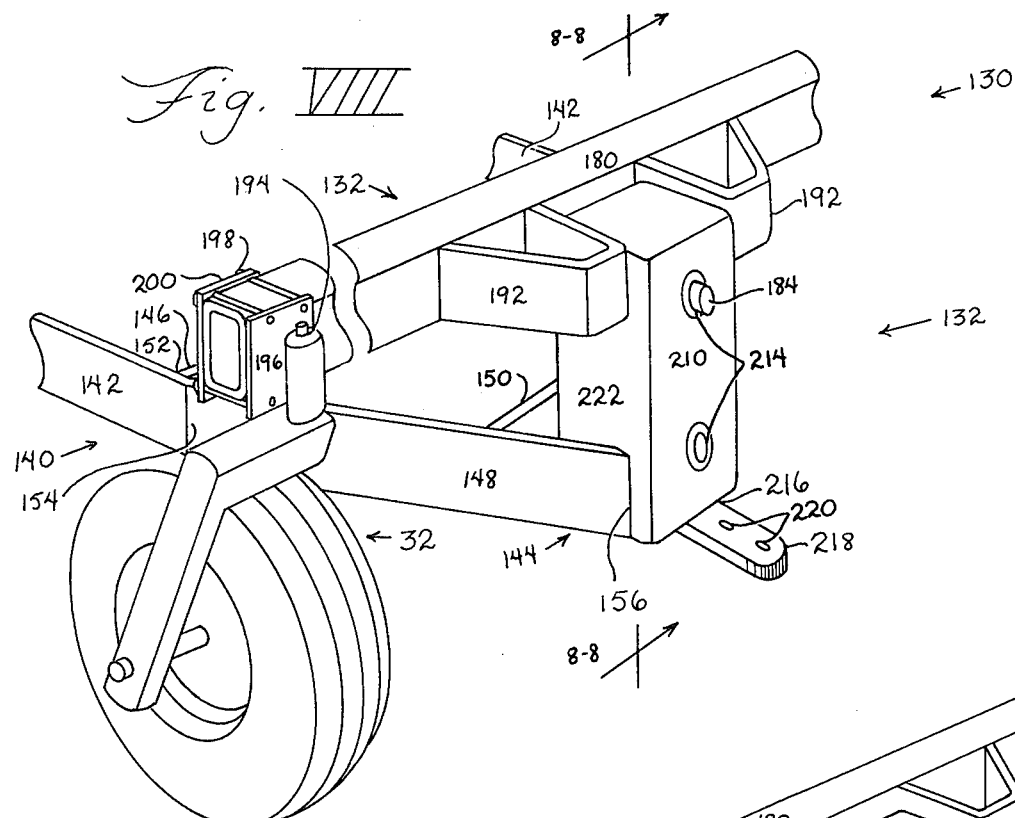
Fig. VIII
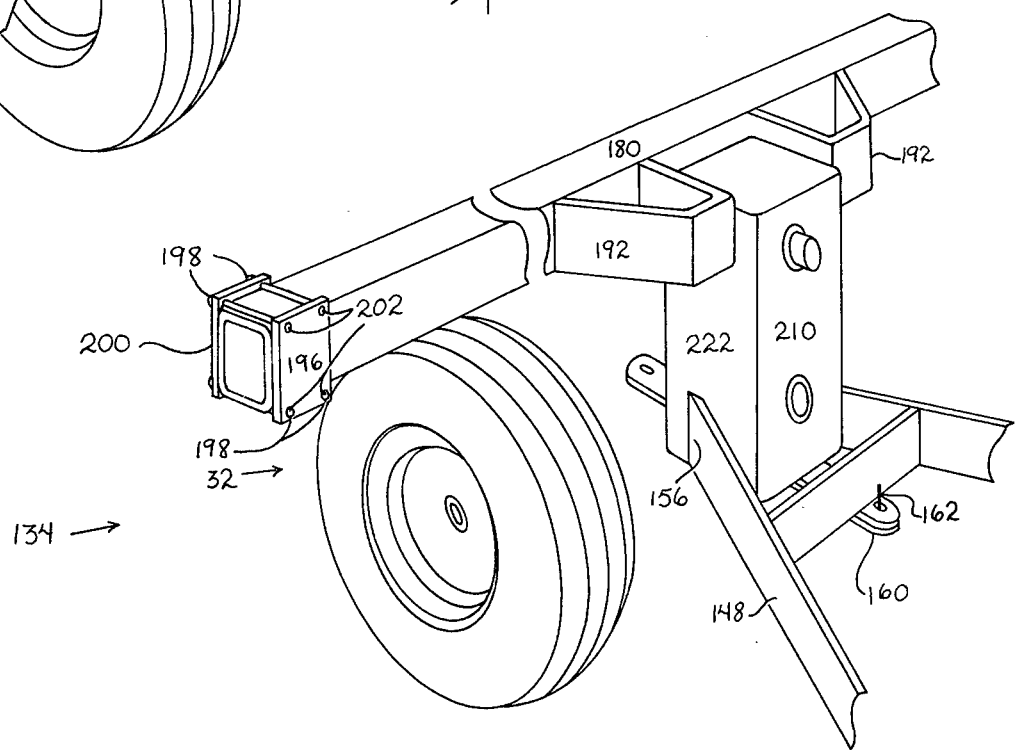
Fig. IX

TANK CARRIER

BACKGROUND OF THE INVENTION

This invention relates to a tank carrier capable of being pulled by a farm tractor and more particularly to a tank carrier for carrying a tank capable of applying suitable liquid material to agricultural fields, while at the same time, providing structural stability and clear viewing area for the tractor operator.

Farmers in the United States of America lead the world in efficiency of food production. Each farmer in the United States can feed more people than any of his other counterparts throughout the world. This ability is due, in part, to the highly mechanized aspects of the farm in the United States. Another factor in food production is the use of liquids applied to the soil being tilled.

There are many difficulties with the efficient application of the liquids to the fields. Generally, liquids are applied from tanks by the use of sprayer, hoses or combinations thereof. The tank is usually mounted on a wheeled vehicle, which vehicle is either towed or self-propelled. The vehicle is customarily towable, because it is usually inefficient to have a self-propelled vehicle which is dedicated to this purpose only. Such a vehicle may not be used sufficiently to warrant this limitation.

If the tank is removably attached to a self-propelled vehicle, more problems are created than are solved. One problem solved is the limited use of a self-propelled vehicle. The created problems involve maintaining the stability of the vehicle with the added weight and bulk, maintaining operator visibility, and other problems. These factors render the installing and removing of the tank complicated and time-consuming—which overwhelms the advantages of the removably attached tank.

On the other hand, a towable vehicle is less expensive, due to the lack of a self-propelling means. However, in order to be truly advantageous, a towable vehicle, must not substantially interfere with common farming functions, and may even cooperate with other farm implements to serve a dual purpose on a trip around a field. It is also desirable to have adjustability incorporated into a towable vehicle so that incorporation of another implement with the tank and sprayer is possible. In fact, such incorporation may even be complementary.

Other advantages of adjustability also become clear. If the height of the vehicle is adjusted, the vehicle may be used with crops at different stages of growth and permit different liquids to be applied as required at the desired stage of growth. Wheel adjustability also permits different row widths to be covered by the same vehicle. Yet adjustability increases the complexity of the vehicle.

Furthermore, the tank for carrying the liquids to the field must be of sufficient size to carry enough liquid to cover a substantial field area. Yet the tank must also be easily transported to the field for use. These desired features can work against each other, because if a tank is large enough to carry substantial liquid, it may also be too heavy or lack sufficient maneuverability to be easily used.

Several towable vehicles are known in the art for transporting liquid tanks to fields for use in applying liquids thereto. These vehicles suffer from many defects. Some vehicles carry the tanks too high and block the view of the tractor driver while achieving the desired result of large capacity. In addition to blocking the view, such high carriage results in a high center of gravity and resultant lack of stability for the vehicle.

If there is an attempt to lower the center of gravity of the vehicle, by reducing the size of the tank, the diminished capacity causes the reduction in efficiency of liquid application to be too great. If the tank size is not reduced, it is extremely difficult to change the structure of the vehicle to accommodate the tank, while at the same time retaining the maneuverability of the vehicle.

An even greater advantage for a tank carrier can be achieved if at least one additional agricultural implement can be used therewith. The lack of stability for existing tank carriers mitigates against such additional implement use. Further, existing tank carriers can block the view of the tractor driver. It thus becomes difficult to use additional implements with existing tank carriers.

Thus, in view of the problems recited herein, it is desirable to improve the efficiency and manner of applying liquids to fields.

SUMMARY OF THE INVENTION

Therefore, it is an object of this invention to provide a tank carrier for agricultural use which improves the efficiency of applying liquids to farm fields.

A further object of this invention to provide an improved towable tank carrier for agricultural use.

A still further object of this invention is to provide an improved towable tank carrier capable of carrying a tank of sufficient size to cover a substantial area.

Yet a further object of this invention is to provide a tank carrier capable of simplifying tank transportation to a field.

Also, an object of this invention is to provide a maneuverable tank carrier.

Another object of this invention is to provide a tank carrier which minimizes the obstruction of the view for the tractor driver.

Yet another object of this invention is to provide a tank carrier which has a low center of gravity, while maintaining a large capacity.

Still another object of this invention is to provide a tank carrier having a low center of gravity.

A further object of this invention is to provide a tank carrier which is stable when being towed.

A still further object of this invention is to provide a tank carrier which permits towing of an additional agricultural implement while the tank carrier is in use.

Yet a further object of this invention is to provide a tank carrier which does not block the view of the tractor driver when an implement in addition to the tank carrier is in tow.

Also an object of this invention is to provide a tank carrier which avoids the necessity of having a tank removably attached to a self-propelled vehicle.

Another object of this invention is to provide a tank carrier which is adjustable to compensate for crop growth.

Yet another object of this invention is to provide a tank carrier is adjustable to compensate for width of crop rows.

These and other objects of this invention (which other objects become clear upon consideration of the specification as a whole) are met by providing a tank carrier having a tank frame pivotally secured below a castor wheel frame with the tank frame being secured to a tractor or other pulling vehicle by a double hitch.

BRIEF DESCRIPTION OF THE DRAWING

FIG. I is a perspective view of tank carrier 10 with tank 12 in place from the rear portion thereof.

FIG. II is a rear view of tank carrier 10.

FIG. III is a side view of tank carrier 10 showing an end view of tank 12.

FIG. IV is a close-up view of first castor wheel mount 28 with first castor wheel 32 removed.

FIG. V is a close-up view of pivot assembly 14.

FIG. VI is a top view of tractor bar 72.

FIG. VII is a cross-section of pivot box 210 along line 8—8 in FIG. VIII.

FIG. VIII is a perspective view of adjustable tank carrier 130 in short position 132.

FIG. IX is a perspective view of adjustable tank carrier 130 in lone position 134.

Throughout the Figures of the drawings, where the same part appears in more than one Figure of the drawings, the same number is assigned thereto.

DESCRIPTION OF THE PREFERRED EMBODIMENTS

A tank carrier for carrying agricultural liquids for application to fields has great capacity, substantial stability, and good utility because a tank frame is pivotally suspended below a castor wheel frame at one end thereof and double hitched to a tractor or other pulling device at the other end thereof.

Referring now to FIG. I, tank carrier 10 is shown from an angular rear perspective looking toward a tractor (not shown). FIG. II is end view of tank carrier 10 looking toward a tractor (not shown). Tank carrier 10 includes a fixed wheel frame 20 pivotally secured to tank frame 70 by pivot assembly 14. Tank 12 is secured to tank frame 70. All elements of tank carrier 10 and tank 12 are made of materials having sufficient strength for heavy-duty agricultural use.

Fixed wheel frame 20 has elements thereof mounted on cross bar 22. Cross bar 22 is a strong metal bar of sufficient strength for heavy-duty, agricultural use. At one end of cross bar 22 is a first wheel end 23 (also shown in FIG. IV). At the other end of cross bar 22 is a second wheel end 24. Within first wheel end 23 is bearing supported and lubricated first castor wheel mount 25. First castor wheel mount 25 has a first wheel aperture 26 for receiving first castor wheel 32.

Second wheel end 24 is structured similarly to first wheel end 23. Within second wheel end 24 is a bearing supported and lubricated second castor wheel mount 27. Second castor wheel mount 27 has therein a second wheel aperture 28 for receiving second castor wheel 34.

Thus, first castor wheel mount 25 is substantially the same as second castor wheel mount 27. Both include a standard bearing and lubrication system within first wheel aperture 26 and second wheel aperture 28 to provide support and durability for first castor wheel 32 and second castor wheel 34. The standard bearing and lubrication system is not shown.

First castor wheel 32 and second castor wheel 34 (shown in FIG. IV with wheel rim 46 removed) are similar in structure and are described as having the same parts with the same part numbers. Each of castor wheels 32 and 34 has a castor wheel support pin 35 which mates in a male-female relationship with first wheel aperture 26 and second wheel aperture 28 respectively. Castor wheel support pin 35 has a washer receiving end 35A above cross bar 22. First wheel aperture 26 and second wheel aperture 28 are substantially vertical and go completely through cross bar 22. Washer 35B locks onto washer receiving end 35A, and holds first wheel 32 and second wheel 34 in cross bar 22. This assembly for either first castor wheel 32 or second castor wheel 34 may be sealed or otherwise protected from the environment in a standard fashion.

At the other end of castor wheel support pin 35 (also shown in FIG. IV) and secured substantially perpendicular thereto is pin bar 36 at pin end 37 of pin bar 36. At the end of pin bar 36 opposed to pin end 37 is support end 38. Secured to support end 38 perpendicular thereto is castor wheel support 39. Support bar end 40 of castor wheel support 39 is secured to support end 38. Axle end 41 is at the other end of castor wheel support 39. A wheel axle 42 is secured at axle end 41.

Castor wheel brace 43 is secured to pin bar 36 and castor wheel support 39 to strengthen the structure. Such securing may be done by welding or equivalent methods. Preferrably castor wheel brace 43 is a right triangle in shape and secured at the legs thereof.

Rotatably mounted on wheel axle 42 is tire rim 46. Tire 48 is mounted on tire rim 46. In this fashion, each of tires 48 may rotate about wheel axle 42 in a vertical plane and about castor wheel support pin 35 in a horizontal plane.

Between first wheel end 23 and second wheel end 24, and secured also to cross bar 22 is pivot mount 50 (also shown in FIG. V). Pivot mount 50 is the contribution of wheel frame 20 to pivot assembly 14. Pivot mount 50 includes main pivot bar 51. Main pivot bar 51 is approximately in the shape of a forty five degree right triangle having the hypotenuse 52 thereof secured below cross bar 22. Pivot supports 54 are welded or otherwise secured to cross bar 22 and main pivot bar 51 at a short distance from the legs 53 of main pivot bar 51.

At the vertex of pivot bar 51 is pivot aperture 56. Pivot aperture 56 is bearing supported and lubricated in a standard fashion. Pivot 56 has a substantially horizontal axis and goes completely through pivot bar 51 and pivot supports 54. This structure reinforces the pivot aperture 56.

Tank frame 70 (also shown in FIG. III) includes a pair of tank support bars 72, on which tank 12 may rest and be secured. Tank support bars 72 are secured in a manner opposed to each other at one end of each by a tractor bar 74. Tractor bar 74 provides for attachment of tank carrier 10 to a tractor (not shown). Secured at each other end of tank support bars 72 is hitch bar 76. Additional agricultural implements (not shown) may be secured to hitch bar 76. Thus, tank support bars 72 combine with tractor bar 74 and hitch bar 76 to from a quadrilateral.

Double tractor hitch 78 (also shown in FIG. VI) has components at each end of tractor bar 74. Such components are oppositely disposed on each end of tractor bar 74 as a first tractor hitch 80 and second tractor hitch 82. First tractor hitch 80 and and second tractor hitch 82 are similar in construction. Each of first tractor hitch 80 and second tractor hitch 82 has a pair of parallel hitch bars 84 (more clearly shown in FIG. VI), hitch bar apertures 85, and a hitch bolt 86 which fits through apertures 85 and the tractor (not shown) to connect tank carrier 10 thereto. First tractor hitch 80 and second tractor hitch 82 are welded or secured in another standard fashion to tractor bar 74.

Adjacent to each of first tractor hitch 80 and second tractor hitch 82 is a frame stand 88. Each of the two frame stands 88 cooperate with first castor wheel 32 and second castor wheel 34 to support tank carrier 10 when tank carrier 10 is not in use. Frame stand 88 includes a stand leg 89 slideably mounted in stand support 90. Stand leg 89 includes a series of leg apertures 91 which line up with stand support aperture 92 to receive stand pin 93 and adjust the length of stand leg 89 and provide appropriate support to hold frame 70 level when tank carrier 10 is not in use.

Opposite tractor bar 74 is hitch bar 76. Centrally located on hitch bar 76 and on the bottom thereof is implement hitch 77. Implement hitch 77 is secured to hitch bar 76 in any standard fashion. The purpose of implement hitch 77 is to permit an additional agricultural implement—such as a disk or a harrow—to be towed behind tank carrier 10 thereby providing a time and labor manner of farming by permitting two functions to be completed with one trip around the field.

Also centrally located on hitch bar 76 and on the top thereof is frame pivot 94. Frame pivot 94 cooperates with pivot mount 50 on cross bar 22 to pivotally connect tank 70 and wheel frame 20. This pivotal connection provides for flexibility and maneuverability for tank carrier 10 while at the same time permitting the tank 12 to be carried low enough to permit viewing of an additional implement being towed behind tank carrier 10.

Frame pivot 94 includes frame pivot support 96 generally in the form of a bar 98 welded or otherwise secured to a top of hitch bar 76. Bar 98 has a solid bar base 100 secured to hitch bar 76. Bar base 100 has triangular butresses 102 secured thereto and to hitch bar 76 as a support thereof.

Opposite bar base 100 is u-shaped receiver 104 which receives pivot aperture 56 therein. Receiver apertures 106 line up with pivot aperture 56 and receive pivot bolt 108 therein to pivotally join tank frame 70 and wheel frame 20.

Tank support 110 is secured to tank support bars 72. Tank support 110 includes yoke 112 secured to tank support bars 72 at yoke base 114. Secured to yoke base 114 as a part of yoke 112 are four yoke arms 116. Yoke arms 116 have a pair thereof secured to each tank support 72 and yoke base 114. Yoke arms 116 cooperate with yoke base 114 to support yoke arch 118. Tank 12 rests directly on yoke arch 118. Yoke 120 straps connect in a standard fashion to yoke arms 116 to hold tank 12 in place.

Tank carrier 10 may also be adjustable to compensate for the height of the crops, the width of the rows of the crops, the size of the tank, the incorporation implement and other factors. This adjustability feature is shown in FIG. VII, FIG. VIII, and FIG. IX. Pivot assembly 14 as shown in FIG. 1, FIG. II, and FIG. V is replaced by pivot box 210 as shown in FIG. VII, FIG. VIII, and FIG. IX. Pivot box 210 permits a substantial amount of flexibility.

As shown in FIG. VII, pivot box 210 has at bushing end 212 a plurality of bushings 214 (two bushings 214 being shown). Bushings 214 have substantially parallel horizontal axes. At the other end of pivot box 210 opposite bushing end 212, is incorporation hitch slot 216. Incorporation hitch slot 216 slideably receives incorporation hitch bar 218. Within incorporation hitch bar 218 are plurality of hitch apertures 220. Hitch apertures 220 are used to lock hitch bar 218 in place in hitch slot 216 and provide a different length of incorporation hitch bar 218 being exposed so that a variety of incorporation implements may be secured to tank carrier 10 and towed by the tractor at the same time as tank carrier 10.

FIG. VIII depicts box tank carrier 130 in short position 132. Adjustable tank frame 140 differs from tank frame 70 by its attachment to pivot box 210. Side bars 142 duplicate the function of tank support bars 72 and are substantially similar thereto. Hitch bar 76 of tank carrier 10 is replaced in box carrier 130 by incorporation hitch support 144.

Incorporation hitch support 144 includes a frame bar 146, two pivot bars 148, a pivot bar brace 150 and a hitch lock 160. Frame bar 146 is secured by welding or other suitable means to side bars 142 substantially perpendicular thereto. At each juncture 152 of side bars 142 and frame bar 146 is secured one of pivot bars 148. Pivot bar 148 is secured at frame bar end 154 to juncture 152. Opposite frame bar end 154 is pivot box end 156 of frame bar 146.

Pivot box end 156 is secured to pivot box 210 on the sides 222 thereof adjacent hitch slot 216. Pivot bar brace 150 is secured at each end thereof to one of pivot bars 148. Pivot bar brace 150 is substantially parallel to frame bar 146. Thus frame bar 146 cooperates with pivot bars 148 to form a substantially isoceles triangle with pivot box 230 at the vertex thereof.

Hitch lock 160 is secured to pivot bar brace 150 and pivot bars 148. Hitch lock 160 is arranged in relation to hitch slot 216, so that incorporation hitch 218 may slide through hitch slot 216 and adjacent to hitch lock 160. Within hitch lock 160 is hitch lock set 162 which cooperates with one of hitch bar set receivers 224 so that hitch lock 226 passes through hitch lock set 162 and set receivers 224 to position incorporation hitch 216 as required. In this manner, the length of incorporation hitch 216 is rendered adjustable.

Adjustable wheel bar 180 serves the same purpose for adjustable tank carrier 130 as cross bar 22 does for tank carrier 10. The structure of adjustable wheel bar 180 differs from that of cross bar 22. Adjustable wheel bar 180 (as shown in FIG. VII) has centrally located rod aperture 182 for receiving pivot rod 184. Pivot rod 184 has a frame bolt aperture 186 at one end thereof capable of receiving lock bolt 188 to thereby lock pivot rod 184 in wheel bar 180.

Opposite frame bolt aperture 186 in pivot rod 184 is pivot bolt aperture 190. Pivot rod 184 has pivot bolt aperture 190 through bushing 214 and frame bolt aperture 186 through rod aperture 182. A lock bolt 188 fits through each of pivot bolt aperture 190 and frame bolt aperture 186 to thereby lock pivot rod 184 in place. In this fashion, adjustable wheel bar 180 may pivot about bushing 214 and pivot rod 180. Alternatively, pivot rod 184 may be welded or otherwise secured to adjustable wheel bar 180.

Secured to adjustable wheel bar 180 are a pair of oppositely disposed pivot stops 192. Pivot stops 192 are positioned adjacent to pivot rod 184 and limit the movement of adjustable wheel bar 180 about pivot rod 184. This prevents undue torque on the tractor, tank carrier 10, and incorporating tool if, for example, first castor wheel 32 falls into a hole in the field. One pivot stop 192 contacts pivot box 210 after desired pivotting and prevents further pivotting.

First castor wheel 32 and second castor wheel 34 are mounted on opposite ends of adjustable wheel bar 180. Wheel bushing 194 receives castor wheel 32 in a standard fashion so that castor wheel 32 may function in an appropriate fashion. Welded or otherwise secured to the outside of wheel bushing 194 is mounting plate 196. Mounting plate 196 is generally rectangular in shape and a bolt receiver 198 at each corner thereof. Mounting plate 196 contacts one side of adjustable wheel bar 180. Backup plate 200 contacts adjustable wheel 180 in opposition to mounting plate 196. Backup plate 200 has bolt receivers 198 at each corner thereof also. Nut and bolt arrangement 202 locks backup plate 200 and mounting plate 196 on adjustable wheel bar 180. Second castor wheel 34 is attached thereto in a similar fashion. By loosening and tightening nut and bolt arrangement 202, first castor wheel 32 and second castor wheel 34 may be positioned relative to each other on adjustable wheel bar 180 and compensate for the change in the width of rows.

FIG. IX depicts adjustable wheel bar 180 mounted oppositely on pivot box 210 when compared to FIG. VIII. Thus FIG. IX depicts long position 134 of tank carrier 10. The change between long position 134 and short position 132 is accomplished by removing lock pin 188, and thence pivot rod 184 and inserting same through bushing 214 on the other side of pivot box 210 through bushing 214. In a similar fashion, mounting plate 196 and backup plate 200 may be reversed to reverse first castor wheel 32 and second castor wheel 34. Similarly, the height adjustable wheel bar 180 is changed by selection of the appropriate bushing 214. Combinations thereof are also possible.

Unless otherwise disclosed, connections between parts hereof are standard. Welding and bolting may be used to make tank carrier 10. Also parts may be molded or shaped from unitary pieces. Combinations thereof with or without other standard connection or securing means may also be used. The pivoting feature provides for flexibility of the tank carrier. This unique combination of elements solves the problems disclosed herein.

Because of the disclosure herein and solely because of the disclosure herein, certain modifications hereof can become apparent to those having ordinary skill in this art. Such modifications are clearly covered hereby.

What is claimed and sought to be secured by Letters Patent of the United States is:

1. A tank carrier including a wheel frame and a tank frame, said tank frame being pivotally secured to said wheel frame, a tank for holding liquid agricultural material secured to said tank frame, wherein:
   (a) a first castor wheel and a second castor wheel are secured to said wheel frame;
   (b) said first castor wheel and said second castor wheel are oppositely disposed;
   (c) a pivot means for pivotally connecting said wheel frame to said tank frame is situated between said first castor wheel and said second castor wheel;
   (d) said tank frame has a pivot side connected to said wheel frame below said wheel frame;
   (e) said tank frame has a tractor side oppositely disposed from said pivot side; and
   (f) said tractor side includes means for connecting said tank carrier to a vehicle capable of pulling said tank carrier.

2. The tank carrier of claim 1 wherein said wheel frame comprises:
   (a) a crossbar having a first wheel end and a second wheel end;
   (b) said first castor wheel secured to said first wheel end and said second castor wheel secured to said second wheel end; and
   (c) a pivot mount secured to said crossbar at a central portion of said crossbar between said first wheel end and said second wheel end to form a part of sid pivot means.

3. The tank carrier of claim 2 wherein said tank frame comprises:
   (a) a hitch bar below and substantially parallel to said cross bar;
   (b) a tractor bar oppositely disposed from and substantially parallel to said hitch bar;
   (c) a first tank support bar oppositely disposed from a second tank support bar;
   (d) said first tank support bar being secured at one end to first end of said hitch bar and at the other end to a first end of said tractor bar;
   (e) said second tank support bar being secured at one end to a second end of said hitch bar and at the other end to a second end of said tractor bar;
   (f) a tank support secured to said tank support bars;
   (g) said tank being secured in said tank support; and
   (h) a frame pivot being centrally secured on said hitch bar to cooperate with said pivot mount to form said pivot means and pivotally connect said tank frame and said wheel frame.

4. The tank carrier of claim 3 wherein said pivot means includes:
   (a) a cylindrical rod secured to said crossbar in a substantially horizontal fashion to serve as said pivot mount;
   (b) a pivot box secured to said hitch bar to serve as said frame pivot;
   (c) at least one rod bushing within said pivot box to receive said cylindrical rod;
   (d) said rod being capable of rotating about its cylindrical axis within said rod bushing; and
   (e) said wheel frame being capable of pivoting about the cylindrical axis of said cylindrical rod.

5. The tank carrier of claim 4 wherein said pivot box is centrally secured to said crossbar and said pivot rod is centrally secured to said hitch bar.

6. The tank carrier of claim 4 wherein said cylindrical rod is welded to said crossbar at a first end of said rod, is inserted into said rod bushing, and pinned in place by a pin through an aperture in a second end of said rod.

7. The tank carrier of claim 4 wherein said pivot box includes at least two rod bushings capable of receiving said pivot, thereby providing a height adjustment for said tank carrier.

8. The tank carrier of claim 7 wherein said crossbar has a first pivot stop secured thereto on one side of said cylindrical rod and a second pivot stop secured thereto on the other side of said cylindrical rod to limit the amount of pivoting by said wheel frame in relation to said tank frame.

9. The tank carrier of claim 8 wherein said pivot box is secured to said hitch bar by a triangulated support, wherein said triangulated support includes:
   (a) a first member secured at a first end thereof to a first end of said hitch bar and said first member secured at an opposite second end thereof to a first side of said pivot box;
   (b) a second member secured at a first end to a second end of said hitch bar and said second member secured at an opposite second end thereof to a second and opposing side of said pivot box;
   (c) a brace secured at a first end to said first member and at a second end to said second member, said brace being between said hitch bar and said pivot box; and (d) a complementary implement hitch mounted at a bottom of said pivot box.

10. The tank carrier of claim 9 wherein said complementary implement hitch is adjustable.

11. The tank carrier of claim 10 wherein said complementary implement hitch:
(a) is slidably mounted in a hitch slot at said bottom of said pivot box; and
(b) includes a plurality of locking apertures therein.

12. The tank carrier of claim 11 wherein said triangulated support:
(a) has an apertured plate secured to said first member, said second member, and said brace; and
(b) provides for at least one aperture in said plate to align with at least one of said locking apertures to have a locking pin inserted therethrough lock said complementary implement hitch in position.

13. The tank carrier of claim 12 wherein said first castor wheel and said second castor wheel are adjustably mounted on said crossbar by an adjusting means.

14. The tank carrier of claim 13 wherein said adjusting means includes:
(a) a mounting plate secured to a castor portion of each of said first castor wheel and said second castor wheel;
(b) said mounting plate abutted said crossbar;
(c) a bolting plate oppositely disposed from said mounting plate and abbutted said crossbar; and p1
(d) at least one nut and bolt arrangement securing said mounting plate to said bolting plate.

15. The tank carrier of claim 14 wherein said at least one nut and bolt arrangement comprises four nut and bolt arrangements, and said first castor wheel and said second castor wheel are thereby rendered movable along said crossbar to thereby compensate for differing widths of rows of crops.

16. The tank carrier of claim 15 wherein said tractor bar includes a double hitch mechanism for attaching said tank carrier to a tractor and a pair of frame stands are secured to said tractor bar for the purpose of permitting said tank carrier to stand when unhitched.

17. The tank carrier of claim 3 wherein:
(a) said first wheel end and said second wheel end have therein a castor wheel bushing for securing said first castor wheel and said second castor wheel to said crossbar;
(b) said pivot mount includes a main pivot bar secured to a bottom central portion of said cross bar;
(c) at least one main pivot bar support secured to said crossbar and said main pivot bar; and
(d) a pivot aperture in said pivot bar support.

18. The tank carrier of claim 17 wherein:
(a) said frame pivot includes a frame pivot support, at least one frame pivot support brace secured to said hitch bar and said frame pivot support;
(b) a u-shaped receiver opposite said hitch bar in said frame pivot support;
(c) oppositely disposed receiver apertures in each arm of said u-shaped receiver to line up with said pivot aperture;
(d) a pivot pin inserted and secured within said receiver apertures and said pivot aperture to pivotally secure said wheel frame to said tank frame; and
(e) a complementary hitch secured to said hitch below said frame pivot.

19. The tank carrier of claim 3 including an adjusting means for adjusting the position of said first castor wheel and said second castor wheel on said crossbar wherein said adjusting means includes:
(a) a mounting plate secured to a castor portion of each of said first castor wheel and said second castor wheel;
(b) said mounting plate abutted said crossbar;
(c) a bolting plate oppositely disposed from said mounting plate and abutted said crossbar; and
(d) at least one nut and bolt arrangement securing said mounting plate to said bolting plate.

20. The tank carrier of claim 19 wherein:
(a) said frame pivot includes a frame pivot support, at least one frame pivot support brace secured to said hitch bar and said frame pivot support;
(b) a u-shaped receiver opposite said hitch bar in said frame pivot support;
(c) oppositely disposed receiver apertures in each arm of said u-shaped receiver to line up with said pivot aperture;
(d) a pivot pin inserted and secured within said receiver apertures and said pivot aperture to pivotally secure said wheel frame to said tank frame; and
(e) a complementary hitch secured to said hitch below said frame pivot.

21. The tank carrier of claim 20 wherein at least one pivot stop is included in said pivot means to limit pivoting of said wheel frame relative to said tank frame.

22. The tank carrier of claim 4 wherein said rod bushing extends completely through said pivot box and can receive said cylindrical rod from either end of said bushing, thereby adjusting the overall length of said tank carrier.

* * * * *